Figure 1:
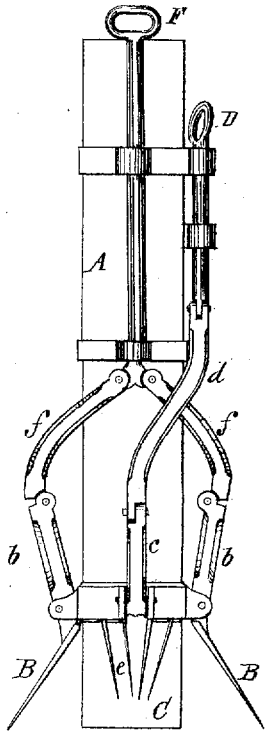
Figure 2:
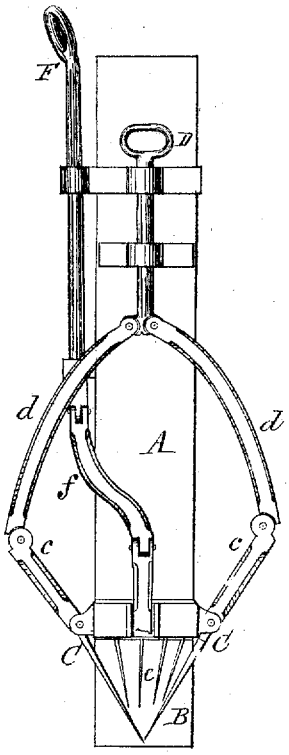
Figure 3:
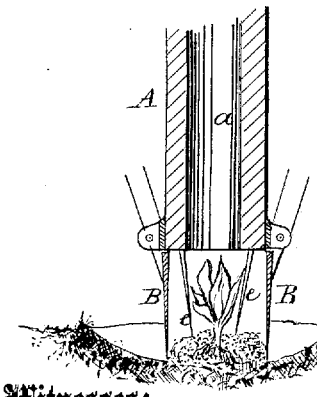
Figure 4:
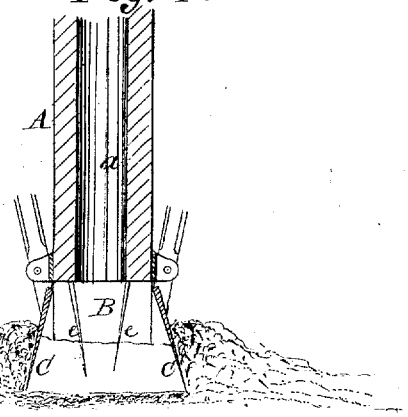

JOHN C. FULLER.

Improvement in Plant Setting Device.

No. 4,832. Reissued March 26, 1872.

Witnesses:

G. Mortimer

R. H. Whittlesey

Inventor:

John C. Fuller

PER

Munn & Co

Attorneys.

AM. PHOTO-LITHOGRAPHIC CO. N.Y. (OSBORNE'S PROCESS.)

UNITED STATES PATENT OFFICE.

JOHN C. FULLER, OF HINMANSVILLE, NEW YORK.

IMPROVEMENT IN TRANSPLANTERS.

Specification forming part of Letters Patent No. 87,037, dated February 16, 1869; reissue No. 4,832, dated March 26, 1872.

Specification describing a new Machine for Transplanting Cabbage, Potato, or other plants, invented by JOHN C. FULLER, of Hinmansville, in the county of Oswego and State of New York.

The invention will be first fully described and then clearly pointed out in the claims.

A is a guide tube or funnel, having pressers B B and openers C C hinged thereto on opposite sides, and at the lower end. *e e* are fingers, which constitute a rest for plant, and are placed also at said lower end. F is a handle, at the lower end of which are pivoted the links *f*, which are themselves pivoted to the shanks *b* of shovels B B. D is another handle, connecting in the same manner by links *d* with the shanks *c* of openers C C.

The mode of operation is as follows: The operator, having closed the openers C C, presses them into the prepared soil at the point determined upon for receiving the plant, and drops the plant, root downward, through the funnel A and between the openers C C. He now pulls upon handle D until the openers C C are removed from the earth, when the plant is held in an upright position by the fingers *e*. He then pushes downward the handle F, and thereby gathers the dirt on both sides of the plant, draws it up around the roots, and presses it up to the stalk.

The advantage to the public of this invention is that it avoids altogether the painful and oft-repeated stooping in the hand-setting of plants, while at the same time it enables a great deal more work to be accomplished in a given time.

Having thus described my invention, what I claim as new, and desire to secure by Letters Patent, is—

1. A transplanter provided, as described, with hinged earth-openers C C, arranged to retire after receiving the plant, and allow the soil to be drawn around it.

2. The combination of said hinged earth-openers C C with the pressers B B, arranged to gather the dirt about the plant after it is dropped in the hole made to receive it.

3. The combination of said earth-openers C C with a guide-tube, A, as and for the purpose set forth.

4. A guide-tube for planters, provided with a rest or fingers, *e*, to hold the plant upright, as described.

5. The tube A, earth-openers C C, and earth-pressers B B, all combined in a transplanter, for the purpose set forth.

JOHN C. FULLER.

Witnesses:

WM. A. SERROTT,
CYRUS S. FRALICK.